United States Patent [19]

Kimura et al.

[11] 4,385,779
[45] May 31, 1983

[54] CONNECTION STRUCTURE FOR VEHICLE BODY PARTS

[75] Inventors: Toshimitsu Kimura, Fujisawa; Tetsuo Shimizu, Yokohama, both of Japan

[73] Assignee: Nissan Motor Co., Ltd., Yokohama, Japan

[21] Appl. No.: 197,728

[22] Filed: Oct. 16, 1980

[30] Foreign Application Priority Data

Oct. 20, 1979 [JP] Japan .......................... 54-145642[U]

[51] Int. Cl.³ ............................................ B60R 19/02
[52] U.S. Cl. .................................... 293/102; 293/120; 293/155
[58] Field of Search ............... 293/155, 102, 120, 121; 52/573; 411/544, 156, 155; 403/408, 30

[56] References Cited

U.S. PATENT DOCUMENTS

| | | | |
|---|---|---|---|
| 2,072,176 | 3/1937 | Monroe | 411/155 |
| 2,223,215 | 11/1940 | Kunz et al. | 52/573 |
| 3,427,063 | 2/1969 | Taylor | 293/155 |

FOREIGN PATENT DOCUMENTS

| | | |
|---|---|---|
| 805642 | 12/1958 | United Kingdom . |
| 1333308 | 10/1973 | United Kingdom . |
| 1425876 | 2/1976 | United Kingdom . |
| 1555429 | 11/1979 | United Kingdom . |

Primary Examiner—Robert R. Song
Attorney, Agent, or Firm—Thompson, Birch, Gauthier & Samuels

[57] ABSTRACT

A resilient member having preselected properties is disposed on a bolt securing an elastomeric bumper to a vehicle body bumper stay for biasing the elastomeric member against the bumper stay with a force which remains within preselected limits despite expansion and creeping of the elastomeric bumper. The hole in the bumper stay and the hole in the elastomeric bumper through which the bolt is disposed are of different diameters, or one is elongate to allow the bolt and the elastomeric bumper to move in a plane normal to the axis of the bolt.

7 Claims, 5 Drawing Figures

CONNECTION STRUCTURE FOR VEHICLE BODY PARTS

BACKGROUND OF THE INVENTION

1. Field of the Invention

The present invention relates to a connection structure by which a resilient bumper is mounted to a vehicle body, and more particularly to a structure which allows for the difference in thermal expansion characteristics of the elastomer of the bumper and the metal components to which the elastomeric bumper is mounted and which further allows for the "creep" characteristics of the elastomeric bumper over a period of time.

2. Description of the Prior Art

In view of various safety regulations it has become a common practice to form the main component of vehicle bumpers of rubber or a similar synthetic elastomer. In a known arrangement, the elastomeric bumper is fixed to the vehicle body bumper stays by bolts or the like. However, this arrangement has suffered from a number of drawbacks which include warpage due to the difference in thermal expansion rates of the metal bumper stays and the elastomeric bumper and the tendancy for the elastomeric bumper to "creep" over a period of time. That is to say, when a marked difference in thermal expansion occurs, the bumper tends to warp due to the lack of compensation for the expansion differences, which warp mars the appearance of the bumper unit. Further, the warpage and expansion of the bumper induces loosening of the bolts securing the bumper to the stays, inviting rattling or disengagement of the bumper from the vehicle.

In the case where a decorative trim is disposed on the surface of the bumper to improve the appearance thereof, the rapid expansion of the elastomeric bumper is apt to force the relatively thin trim outwardly against the restraining effect of the bolts, accordingly bending or otherwise damaging the trim.

SUMMARY OF THE INVENTION

The present invention features a simple and ingenious arrangement for connecting an elastomeric bumper to metal vehicle body bumper stays which allows for both "creep" and the differences in thermal expansion. To achieve this, fasteners such as securing bolts, are disposed through aligned holes, one of which is larger in diameter than the other or elongated in the longitudinal direction of the bumper to allow for movement of the bumper relative to the stays. This is combined with a plate spring or spring washer which applies a predetermined clamping force to the bumper to hold it against the bumper stay without rattling or coming loose. This predetermined clamping force is sufficient to maintain continuous pressure on the elastomeric bumper and to prevent movement of the bumper relative to the stays. Additionally, when the elastomeric bumper material "creep" due to fatigue, the resilient member will compensate therefor and retain the bumper and bumper stay together with a sufficient clamping force.

BRIEF DESCRIPTION OF THE DRAWINGS

The present invention will become more clearly appreciated from the following description taken in conjunction with the accompanying drawings in which like numerals denote corresponding elements and in which.

DETAILED DESCRIPTION OF THE PREFERRED EMBODIMENT

Figure 1:
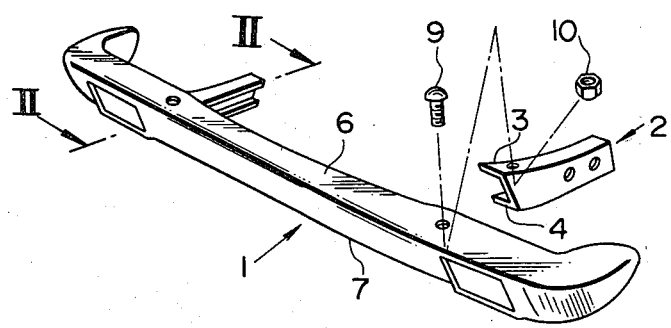
FIG. 1 is an exploded perspective view of an elastomeric bumper and securing vehicle body bumper stays.
Figure 2:
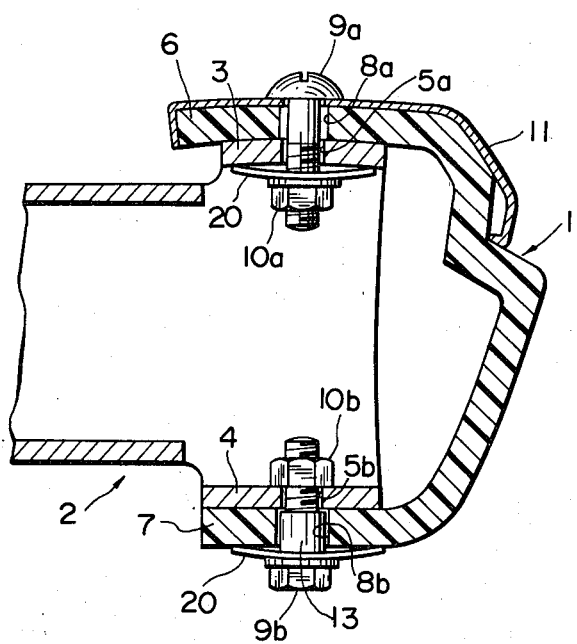
FIG. 2 is a sectional view of a first embodiment of the present invention taken along line II—II of FIG. 1.

Turning now to the drawings and more specifically to FIGS. 1 and 2, a first embodiment of the present invention is shown in which an elastomeric bumper 1 is mounted to vehicle body bumper stays 2 by nuts and bolts. At each mounting site, the upper wall 6 of the bumper 1 is formed with a through hole 8a, and a through hole 5a is formed in the upper wall 3 of the bumper stay 2 and is aligned with the hole 8a. One of the two holes 5a and 8a is arranged to be either larger than the other or elongate in the longitudinal direction of the bumper. The lower wall 4 of the bumper stay is likewise formed with a through hole 5b while the lower wall 7 of the bumper is formed with a through hole 8b, aligned therewith. As before, one of these holes 5b, 8b is arranged to be either larger than the other or elongate in the longitudinal direction of the bumper.

In order to secure the bumper 1 to the bumper stays 2, a bolt 9a is disposed through the holes 5a, 8a as best seen in FIG. 2. A resilient member 20 (in this case a plate spring) is disposed about the bolt 9a and is arranged to engage the inner surface of the upper wall 3 of the bumper stay. A nut 10a secures the resilient member 20 onto the bolt 9a to apply a predetermined clamping force or surface pressure between the bumper upper wall 6 and the bumper stay upper wall 3. If desired, a metal trim 11 can be secured to the upper outer surface of the elastomeric bumper and held in place by the bolt 9a. A bolt 9b is disposed through the holes 5b, 8b. This bolt has a stepped diameter and is disposed as shown, with the large diameter portion 13 received in lower bumper hole 8b. A second resilient member 20 is interposed between the head of the bolt 9b and the elastomeric bumper lower wall 7. A nut 10b is threadably engaged onto the bolt 9b to apply through the resilient member 20 a predetermined clamping force or surface pressure to the bumper stay lower wall 4 and the bumper lower wall 7.

Figure 3:
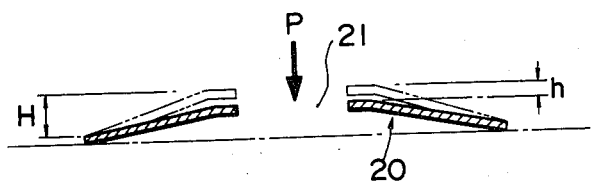
FIG. 3 is a sectional view of a plate spring used in the first embodiment.

FIG. 3 is a cross section of a plate spring as used as the resilient member 20 in the arrangement shown in FIG. 2. In this figure, H represents the initial undeformed height of the member 20, and P represents the force which will produce a deformation amount h. A through hole 21 accommodates the bolt to which it is mounted. In connection with this arrangement, given that:

Fo = the supporting force required at each of the connection sites;

Fcr = the critical load stress which causes lateral deformation of the bumper;

P = the force which applied to the resilient member 20 will produce a deformation of h;

A = the contact area of the resilient member; and $\mu$ = the coefficient of friction between the bumper and the stay;

then the surface pressure $\sigma$ required at the attachment site is given by the following relationship:

$$Fo/A < \sigma < Fcr/\mu A \quad (1)$$

Let it be further assumed that with a certain surface pressure, bumper distortion will occur due to a "creeping" phenomenon after a given period of time has elapsed, making it necessary for the resilient member 20 to allow for the creep-induced distortion, yet maintain a surface pressure which satisfies relationship (1).

Figure 5:
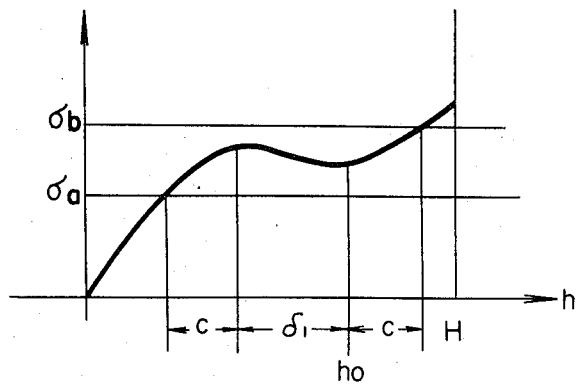
FIG. 5 is a graph showing the reaction characteristics of the elastomeric bumper shown in FIG. 2.

The required characteristics of the resilient member are shown in FIG. 5. In this graph, the abscissa represents the amount of deformation (h) of the resilient member 20, and the ordinate represents the surface pressure ($\sigma$) applied by the resilient member. Hence, if the initial deformation of the resilient member is set at ho, and this applies a suitable surface pressure which falls within the range of $\sigma a$ and $\sigma b$ and the surface pressure remains within this desired range upon a variation in deformation of $\delta 1 \pm c$, then the resilient member meets the requirement of the invention, given that $\sigma a = Fo/A$, $\sigma b = Fcr/\mu A$, and H is the height of the resilient member 20 in its initial undeformed state.

Thus, according to the invention, with the provision of a resilient member 20 having the desired reaction properties with a bolt securing the bumper to the bumper stay, it is possible to attach a member formed of an elastomeric material to a metal vehicle component or the like and maintain the appropriate surface pressure therebetween, despite expansion and/or creeping of the elastomer. Additionally, when the elastomeric bumper material "creeps" due to fatigue, the resilient member will compensate therefor and retain the bumper and bumper stay together with a sufficient force. Further, in the case where a metal trim is placed on the upper surface of the bumper to improve its appearance, even if the bolt which secures it along with the bumper to the stay is slightly overtightened, the resilient member 20 absorbs this and prevents the trim from being damaged.

Further, it is preferable according to the present invention to provide a stepped bolt such as that shown at 9b in FIG. 2 to assure that resilient member 20 attached thereto is resiliently held with the predetermined surface pressure, and excessive tightening of the bolt is prevented. Of course, both bolts 9a, 9b can be so stepped, if desired.

Figure 4:
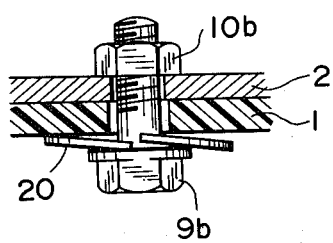
FIG. 4 is a sectional view of an alternative arrangement wherein the spring plate shown in FIG. 3 is replaced with a spring washer.

FIG. 4 shows a possible variation of the second embodiment wherein the spring plate (resilient member 20) is replaced with a spring washer. However, it is pointed out that the present invention is not limited to spring plates or spring washers and that any suitable alternative may be used, provided it exhibits the appropriate reaction properties.

Thus, in summary, the present invention features a device for attaching a rubber or synthetic elastomeric member to a metal support by a simple fastener, such as a bolt, which maintains a suitable pressure between the interface defined between the elastomeric member and metal support member to allow for thermal expansion and creeping of the elastomeric member, and which prevents loosening of the securing bolts. The arrangement of the present invention further compensates for and/or prevents excessive tightening of the securing bolts which would damage a decorative trim disposed on the elastomeric bumper, yet permits movement of the bumper in a plane normal to the axes of the securing bolts.

What is claimed is:
1. A bumper mounting assembly comprising:
    a metal bumper support having a first through hole therein;
    an elastomeric member disposed on said support, said elastomeric member have a second through hole which overlays said first through hole, said first and second through holes having different cross sectional areas;
    a fastener disposed through said first and second through holes for securing said elastomeric member to said support; and
    a deformable resilient member associated with said fastener for applying a surface pressure to said elastomeric member which surface pressure biases said elastomeric member against said support, said surface pressure remaining within a predetermined range irrespective of the expansion of said elastomeric member within a predetermined range.
2. The assembly as claimed in claim 1, further comprising a metal trim disposed on the surface of said elastomeric member and secured thereon by said fastener.
3. The assembly as claimed in claim 1, wherein said elastomeric member is a vehicle bumper and said metal bumper support is a bumper stay.
4. A bumper mounting assembly comprising:
    a metal bumper support having a first through hole therein;
    an elastomeric member disposed on said support, said elastomeric member having a second through hole which overlays said first through hole, said first and second through holes having different cross sectional areas;
    a fastener disposed through said first and second through holes for securing said elastomeric member to said support, said fastener having first and second diameter portions which define a shoulder therebetween, said shoulder being adapted to abut said support and limit the amount of axial movement of said fastener with respect to said elastomeric member; and
    biasing means associated with said fastener for biasing said elastomeric member against said support, the biasing pressure generated by said biasing means remaining within a predetermined range irrespective of the expansion of said elastomeric member within a predetermined range.
5. A bumper mounting assembly comprising:
    a metal bumper support having a first through hole therein;
    an elastomeric member disposed on said support, said elastomeric member having a second through hole which overlays said first through hole, said first and second through holes having different cross sectional areas;
    a fastener disposed through said first and second through holes for securing said elastomeric member to said support; and
    a deformable resilient member associated with said fastener for applying a surface pressure $\sigma$ to said elastomeric member which surface pressure biases said elastomeric member against said support, said surface pressure being such that:

$$Fo/A < \sigma < Fcr/\mu A$$

wherein:

Fo = the force provided by said resilient member;

Fcr = the critical load stress which causes deformation of said elastomeric member;

P = the force which when applied to said resilient member will produce a given deformation;

A = the contact area of said resilient member; and $\mu$ = the coefficient of friction between said elastomeric member and said metal support;

said resilient member being deformed by a predetermined amount without the surface pressure applied thereby falling below a lower limit equal to Fo/A or exceeding an upper limit equal to Fcr/$\mu$A.

6. The assembly as claimed in claim 4, further comprising a metal trim disposed on the surface of said elastomeric member and secured thereon by said fastener.

7. The assembly as claimed in claim 4, wherein said elastomeric member is a vehicle bumper and said metal bumper support is a bumper stay.

* * * * *